United States Patent [19]

Fales, III

[11] 3,987,445

[45] Oct. 19, 1976

[54] OBLIQUE SCATTER OBJECT DETECTION AND LOCATION SYSTEM

[76] Inventor: David Fales, III, 620 Hastings Road, Towson, Md. 21204

[22] Filed: Feb. 11, 1963

[21] Appl. No.: 257,463

[52] U.S. Cl. .................... 343/112 R; 340/258 A; 343/100 R; 343/117 A; 343/867; 343/869; 325/475; 325/476
[51] Int. Cl.² .................... G01S 5/04; G01S 3/42
[58] Field of Search ............ 343/112, 100, 15, 115, 343/867, 869, 102, 117 A, 112.1; 325/475, 476, 371, 306, 305; 340/258 A

[56] References Cited
UNITED STATES PATENTS

| | | | |
|---|---|---|---|
| 1,471,165 | 10/1923 | Isreal | 325/475 X |
| 1,702,440 | 2/1929 | Hinton | 325/371 X |
| 2,190,717 | 2/1940 | Kummich et al. | 343/115 |
| 2,608,686 | 8/1952 | Hastings | 343/105 |
| 2,651,032 | 9/1953 | Torcheux et al. | 343/105 |
| 2,817,081 | 12/1957 | Roberts | 343/15 X |
| 2,975,275 | 3/1961 | Adams | 325/305 |
| 3,036,276 | 5/1962 | Brown | 325/306 X |
| 3,036,301 | 5/1962 | Wiesner | 343/100 |
| 3,138,800 | 6/1964 | Speller | 343/117 |

OTHER PUBLICATIONS
Radio–Craft, Apr. 1939, pp. 605, 629, 631.

*Primary Examiner*—Maynard R. Wilbur
*Assistant Examiner*—Richard E. Berger
*Attorney, Agent, or Firm*—Shapiro and Shapiro

EXEMPLARY CLAIM

1. A method of locating an object capable of reflecting energy from five spaced transmitters to a point remote from said transmitters, which comprises producing at said remote point five signals as a function, respectively, of the relative value of the direct path length from each transmitter to said remote point and the corresponding reflected path length from each transmitter to said object and then to said remote point, and computing from said signals positional data with respect to said object.

11 Claims, 9 Drawing Figures

INVENTOR.
DAVID FALES III
BY Parker and Walsh
ATTORNEYS

OBLIQUE SCATTER OBJECT DETECTION AND LOCATION SYSTEM

This invention relates to a system for detecting and locating objects by means of the oblique scatter of energy incident upon the objects, and more particularly to a passive, long range, over-the-horizon detection and location system for missile launchings, nuclear blasts, and the like.

The present invention is based upon the detection of energy, and in particular electromagnetic wave energy, transmitted from a remote transmitter and scattered from an object to a receiver. The scattering of energy may occur by reflection, refraction, reradiation, or other phenomena, the term "reflection" being used generically to describe all such scattered energy. The principles of the invention are not limited to the detection and location of solid objects, the term "object" being used generically to describe any form of disturbance capable of scattering energy, whether a solid object, ionized gas, shock wave, or other disturbance. The invention is especially useful in the detection and location of moving objects by means of radio waves, which for long range operation are preferably in the 0.5 megacycle to 30 megacycle band. The system of the invention is passive, in that it may utilize existing transmitters, there being many in the frequency band specified, but under appropriate circumstances transmitters may be provided for specific use in accordance with the invention. The principles of the invention are well suited to early warning systems for detecting an ICBM attack and for determining the trajectory of missile warheads, but although the invention represents an improvement upon existing systems of this type, its applicability is wider in scope.

It is accordingly a principal object of the invention to provide improved apparatus and methods for detecting and locating objects.

Another object of the invention is to provide a passive oblique scatter system capable of detecting a disturbance in any direction and thereby to provide omnidirectional surveillance over known and unknown regions.

A further object of the invention is to provide a system of the foregoing type which does not rely upon special geography and which can detect and provide the location of a disturbance with an arbitrarily low false alarm rate.

Another object of the invention is to provide a system of the foregoing type which utilizes simple, readily available components, including small unobtrusive antennas.

Still another object of the invention is to provide unique apparatus and methods for receiving energy such as electromagnetic waves.

A still further object of the invention is to provide unique apparatus and methods for producing beat frequency signals in response to energy reflected from moving objects.

Yet another object of the invention is to provide unique apparatus and methods for locating moving objects by means of reflected energy.

Still another object of the invention is to provide unique apparatus and methods for emphasizing a reflected signal with respect to a direct signal and for producing an output in accordance with the relationship between the signals.

An additional object of the invention is to provide unique apparatus and methods for producing an output in response to energy received from directions other than a predetermined direction.

Still another object of the invention is to provide unique apparatus and methods for determining the direction of arrival of a first signal in the presence of an interfering signal having a different direction of arrival.

A further object of the invention is to provide unique apparatus and methods for determining the bearing of reflected energy in the presence of directly received energy.

A still further object of the invention is to provide improved apparatus and methods for locating an object by means of energy transmitted from a plurality of spaced transmitters and reflected from said object to a remote point, the energy preferably being transmitted at a plurality of frequencies.

The foregoing, and other objects, features, and advantages of the invention, and the manner in which the same are accomplished, will become more readily apparent upon consideration of the following detailed description of the invention taken in conjunction with the accompanying drawings, which illustrate preferred and exemplary embodiments, and wherein.

Figure 1:
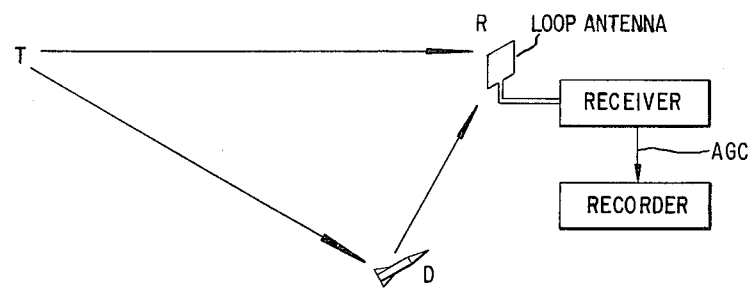
FIG. 1 is a block diagram illustrating a basic principle of the invention and one form of implementation of the principle.

Referring to the drawings, FIG. 1 illustrates a basic system of the invention for detecting objects capable of reflecting energy, in this instance radio waves, from a transmitter located at T to a remote receiver located at R. The transmitter is preferably an existing omnidirectional radio transmitter operating, for example, at a carrier frequency in the band from about 0.5 megacycles to about 30 megacycles. Adequate reflections even from small objects, such as aircraft, have been found to occur for these frequencies. The receiver is set up at a convenient location and is tuned to the frequency of the remote transmitter. For illustrative purposes it may be assumed that the receiver is an ordinary direction finder receiver of the superheterodyne type, having a loop antenna connected to its input and having a recorder connected to its automatic gain control circuit to record variations therein. The invention may use narrow band receivers (e.g., 100 cps bandwidth) to obtain advantages such as low noise and minimum interference.

Since the energy transmitted directly from T to R is many orders of magnitude greater than the energy reflected from an object D, the loop antenna is oriented to place the null of its radiation pattern in alignment with the directly received energy, so as to render the receiver substantially insensitive to such energy. However, the antenna is sensitive to energy received from any direction other than along the line TR, and in the pictorial representation of FIG. 1 the antenna is sensitive to the energy received along the path TDR by reflection from the object at D.

Figure 2:
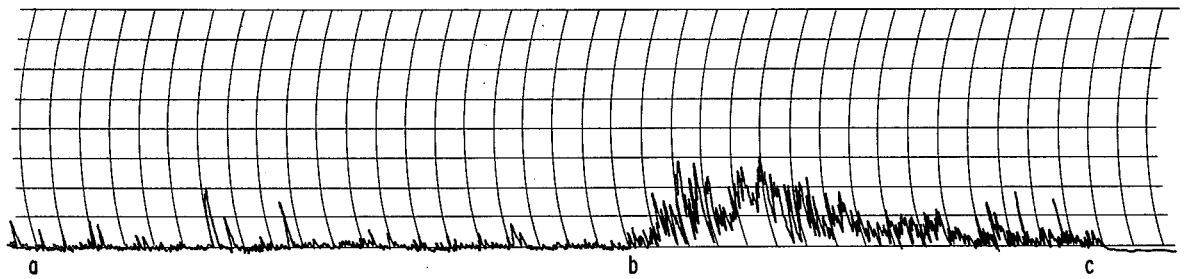
FIG. 2 is a graphical diagram illustrating a signal derived from the automatic gain control of the receiver of FIG. 1.

FIG. 2 shows a recording of the AGC voltage, the portion of the curve between points a and b representing a level corresponding to zero input signal and full receiver gain. When a reflecting object enters the field of the transmitter, a disturbance is recorded as indicated by the portion of the curve from b to c.

Figure 3:
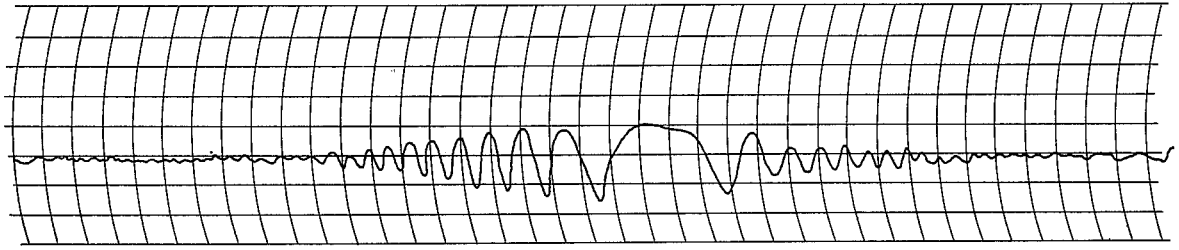
FIG. 3 is a graphical diagram illustrating the production of a beat frequency signal in accordance with the invention.

If the loop antenna is slightly misoriented, so as to accept a small amount of the signal transmitted directly from T to R, some of the directly received energy will be combined with the reflected energy. If the object is moving, as is usually the case, the length of path TDR will change with respect to the path length TR, except for the special case to be described hereinafter wherein the object moves so as to maintain the path length TDR constant. If the path length TDR is changing, the frequency and phase of the energy received by reflection will differ from the frequency and phase of the directly received energy, and because of the existence of non-linear devices (mixers) in the receiver, a difference frequency equal to the difference between the frequency of the signal received along the path TDR and the signal received along the path TR will appear in the automatic gain control circuit. Because of the filters normally present in the automatic gain control circuit, only the difference frequency, which is relatively low (e.g., less than 100 cps), will be recorded by the recorder, a typical plot being shown in FIG. 3. In the example shown the difference frequency decreases to a minimum and then increases. Such a plot may be obtained, for example, when the path length TDR decreases to a certain value and then increases again, the instantaneous difference frequency represeneting the representing of change of the path length TDR.

Figure 4:
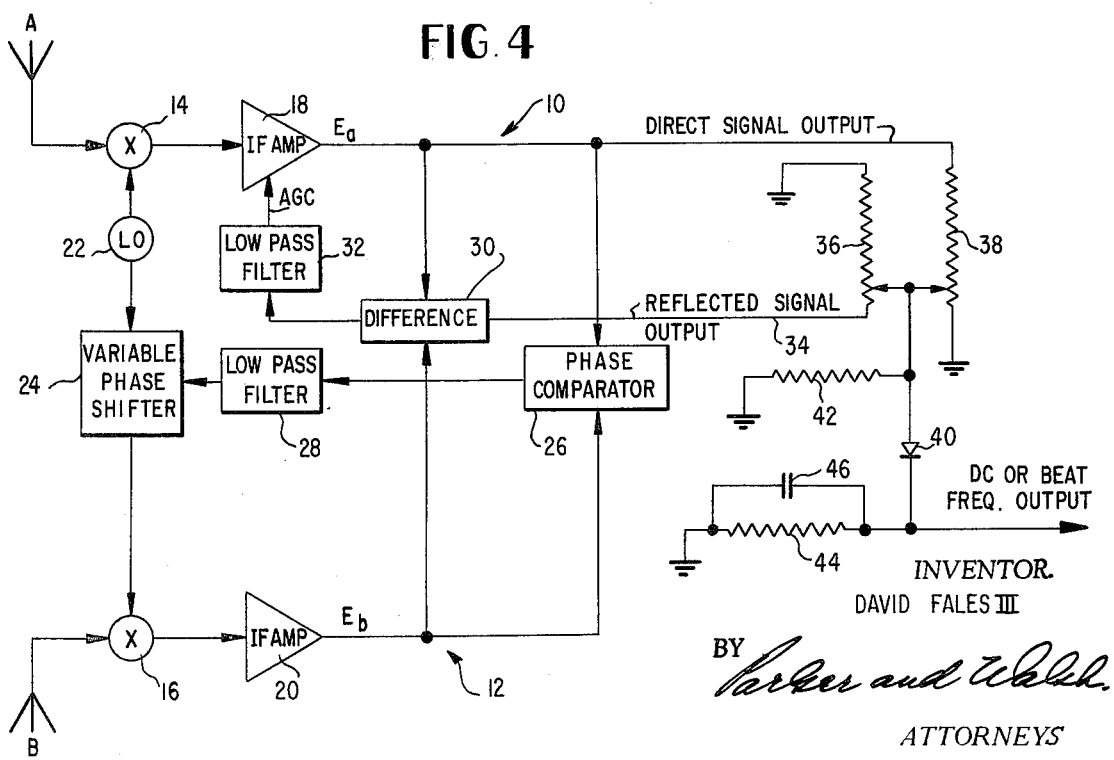
FIG. 4 is a block diagram of a double channel receiver in accordance with the invention.

The frequency of the transmitted energy must be such as to propagate along all three sides of the triangle TDR. For long range detection, frequencies below 30 megacycles are preferred. This portion of the electromagnetic spectrum is almost entirely filled with radio signals from existing transmitters, so that for almost any chosen position of the receiver R suitable transmitters can be located for use in connection with the detection of objects in any desired region. While the system described is essentially an azimuthal locating system, which does not take into consideration the curvature of the earth, the scope of the invention is not limited to line-of-sight transmission. To the contrary, the invention is especially useful for long range detection, wherein both the direct and reflected signals are sky waves, which are reflected or refracted one or more times from the ionosphere. Because the angle of arrival of signals under 30 megacycles is not constant with time, due to the effect of ionospheric movements, magnetic storms, etc., the loop antenna must be adjusted to compensate for the variation of the arrival angle. This may be done manually, by observing the output of the AGC circuit in the absence of a disturbing object, or may be accomplished automatically by an electrical or electromechanical servo system. FIG. 4 illustrates a double channel receiver for this purpose, which also avoids the difficulty of adjusting a loop antenna to accommodate vertical as well as horizontal components of arrival angle.

In FIG. 4 each of the channels 10 and 12 comprises an antenna A or B, preferably an omnidirectional type such as a short stub arranged vertically with respect to the ground or a ground plane. Each channel also comprises a mixer 14 or 16 and an IF amplifier 18 or 20. The mixers may be supplied from a common local oscillator 22, a variable phase shifter 24 being interposed between the oscillator and one of the mixers as shown. This permits adjustment of the phase of the signals in one channel with respect to the signals in the other. The adjustment is made by means of a phase comparator 26, which compares the phase of the signals $E_a$ and $E_b$ at the output of the receptive channels and provides a bipolar control signal which is filtered by a low pass filter 28 and adjusts the phase shifter 24. At least one of the channels has a gain control to permit the adjustment of gain of one channel with respect to the other. In the form shown the amplifier 18 has an automatic gain control circuit actuated from a difference detector 30, which produces a bipolar control signal in response to the difference in amplitude of the output from the two channels, the control signal being filtered by a low pass filter 32 and applied to the gain control of the amplifier. Variable phase shifters, phase comparators, and difference detectors are well known in the art, and any appropriate conventional type may be utilized. For example, phase comparator 26 may be of the type shown on p. 483 of "Electron Tube Circuits" by Seely, McGraw-Hill, 1950, the outputs $E_a$ and $E_b$ of the channels 10 and 12 constituting the unknown $e$ and reference $e_1$ referred to by Seely. When signals $E_a$ and $E_b$ are in phase, the comparator has zero output; when there is a phase difference, the comparator produces a DC output with polarity dependent upon which signal leads or lags. The difference circuit 30 may comprise a summing (or subtraction) network of resistors, which produces an output proportional to the difference of the signals $E_a$ and $E_b$, together with a circuit like phase comparator 26 just described. The output of the resistor network constitutes the signal $e$, while $E_b$ is shifted 90° and is again used as reference $e_1$. When $E_a$ and $E_b$ are equal, the output of the difference circuit is zero; when they are not equal, the output is a DC with polarity dependent upon which is greater.

In the use of the receiver illustrated in FIG. 4, the antennas A and B are spaced apart a sufficient distance so that the phase of the energy received by the antennas will vary with the direction of arrival. With the receiver tuned to a selected transmitter, the difference detector 30 adjusts the gain of amplifier 18 so as to maintain the gain of the channels equal, while the phase comparator 26 adjusts the phase of the local oscillations applied to mixer 16 so as to maintain equal phase of the directly received signals at the output of the channels. Once the gain and phase are properly adjusted, the outputs from the difference detector and phase comparator will be substantially zero, but if a variation in phase or amplitude occurs, a correcting signal of the appropriate polarity will be applied to the phase shifter or the automatic gain control circuit so as to rebalance the channels.

When a reflected signal arrives from a direction different from the direct signal, a reflected signal output will be obtained on lead 34 from the difference detector 30 (summing network), because of the difference in phase of the reflected signals at the output of the channels. If the reflected signal is at a different frequency from the direct signal, and the reference signal in blocks 26 and 30 is the direct signal (due to its much greater amplitude), the outputs of blocks 26 and 30 due to the reflected signal will be AC and will not be passed by the filters 28 and 32 because of their long time constants. The reflected signal output on lead 34 is applied to a potentiometer 36, the tap of which is connected to the corresponding tap of a potentiometer 38 to which the direct signal is applied from one of the channels. With the grounding arrangement shown, potentiometers 36 and 38 constitute a blending attenuator which permits the addition of an appropriate level of direct signal with the reflected signal. The combined signal is applied to a diode mixer 40 across an input resistor 42. The output from the mixer is taken across a load comprising a resistor 44 and a condenser 46 in parallel and will be a D.C. in the absence of a moving object or a beat frequency when a moving object is present.

Figure 5:
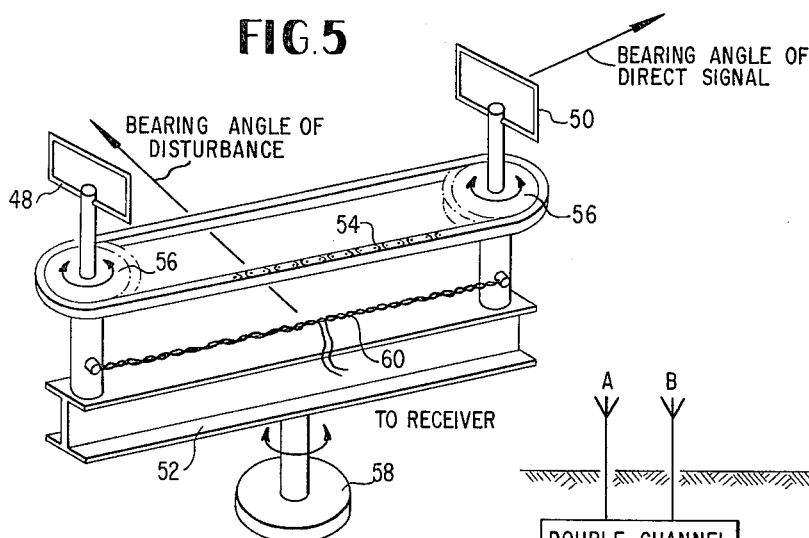
FIG. 5 is a somewhat diagrammatic perspective view of one embodiment of the invention which may be utilized to determine the bearing angle of a disturbance.

The system as described thus far detects the existence of a disturbance and indicates whether the disturbance is moving or stationary. The invention may also be utilized to ascertain the bearing angle of a stationary object and the geographical location and velocity of a moving object. FIG. 5 illustrates an antenna system of the invention having two independent, controllable nulls which may be utilized to determine the bearing angle of a reflecting disturbance in the presence of an interfering signal constituted by the direct transmission. As shown, two vertical loop antennas 48 and 50 are mounted in spaced relation upon a support 52. The antennas are rotatable about vertical axes so as to maintain the planes of the loops parallel. This is indicated diagrammatically by the continuous chain 54 which engages sprocket wheels 56 for turning the loops. Any suitable drive means may be used. Support 52 is rotatable upon a base 58 so as to vary its orientation, i.e., the orientation of a line extending between the antennas. Chain 54 may be adjusted so as to orient the nulls of the individual antennas into alignment with the direct signal, thereby to minimize reception of the direct signal. By connecting the lead wires 60 from the loop antennas in series opposition another null may be obtained when the phase and amplitude of the signals in the loops are balanced. If the loops have equal sensitivity (or are adjusted by an attenuator to provide the same), the phase may be equalized by rotating the support 52 until a line joining the antennas is perpendicular to the direction of arrival of a reflected signal. The bearing angle of a disturbance may thus be determined from the orientation of the support 52. The rotational mechanism for the chain 54 may be interconnected with the rotational mechanism for the support 52 so that once the loops are oriented to reject the direct signal, the orientation will be maintained regardless of rotation of the support 52. The lead wires 60 may be connected to any suitable receiver, as indicated in FIG. 1 for example.

Figure 6:
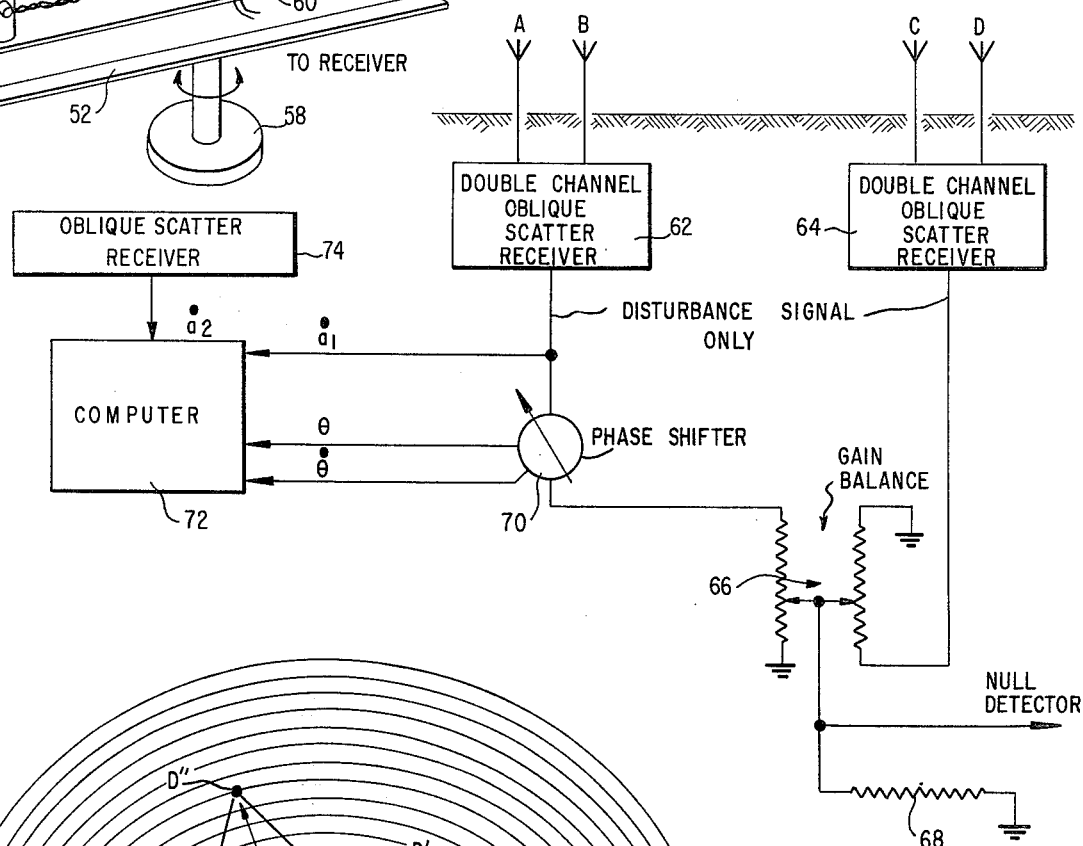
FIG. 6 is a block diagram of another form of apparatus for determining the bearing angle of a disturbance, for locating the disturbance and determining its velocity.

FIG 6 illustrates an electrical system for accomplishing the functions of the apparatus of FIG. 5, and which avoids limitations imposed by mechanical constructions. This embodiment of the invention employs a pair of double channel oblique scatter receivers 62 and 64, each of which may be the type illustrated in FIG. 4, having a pair of parallel omnidirectional antennas A and B or C and D. Each receiver is adjusted in the manner previously described so that it is balanced for direct signals. The output of each receiver is thus a DC in the case of a detected stationary object or a beat frequency in the case of the moving object. If the receiving antennas A and B are spaced appreciably from the receiving antennas C and D, so as to produce a phase difference, the bearing of the disturbance (beat frequency) signal can be determined by balancing the outputs of the receivers. Gain balance can be obtained by means of the blend potentiometer 66, the tapped output of which is applied across a resistor 68 to a conventional null detector. Phase balance may be obtained by placing an adjustable phase shifter 70 in the lead from a receiver to the gain balance control. When the phase shifter and gain balance control are adjusted to produce a null as indicated on the null detector, the bearing angle can be read from a calibrated dial on the phase shifter control.

Figure 7:
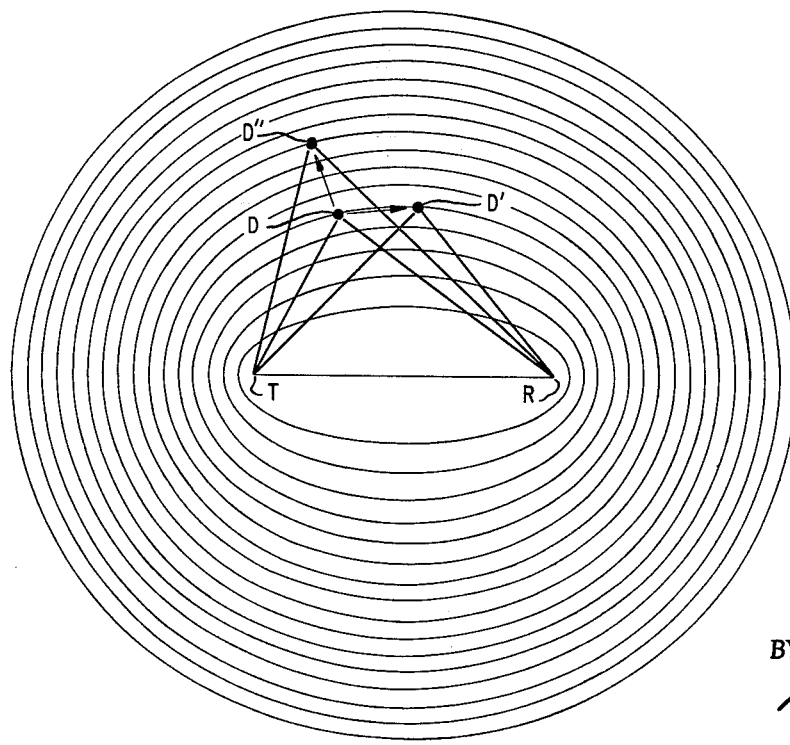
FIG. 7 is a geometric diagram illustrating the manner in which a beat frequency signal may be produced in accordance with the invention.

It can be shown mathematically that if the reflection point is travelling in a straight line and at constant speed, a single beat frequency detection will suffice to locate the object with respect to the receiver if information is available as to the bearing and rate of change of bearing of the object. FIG. 7 illustrates the geometry, in two dimensions, of a system of the invention employing a single transmitter located at T and receiving apparatus located at R, the distance and direction TR being known if the transmitter is identified. The receiving apparatus may be of the type illustrated in FIG. 6, for example. Points T and R are shown as the foci of a family of ellipses, an ellipse being defined as the locus of points the sum of whose distances to the foci is constant. Thus if an object moves along one of the ellipses, as from D to D', the phase of the reflected energy will remain constant relative to the direct signal, because by definition, $TD + DR = TD' + D'R$. If the object moves in another direction, as to D'', the phase and frequency of the reflected energy will differ from the directly transmitted energy. In the case illustrated, where the object is moving outwardly in the system of ellipses, the phase of the reflected energy will lag and its frequency will be lower.

If the family of ellipses with foci T and R is drawn such that the path length TDR changes by one wavelength of the transmitted energy as the object moves from one ellipse to the next, the frequency difference between the reflected and direct signals represents the speed with which the reflection point is moving from one ellipse to the next, and the period of the difference frequency is exactly the time required for the disturbance to move between two adjacent ellipses. The beat frequency thus defines the speed of the reflection point perpendicular to the ellipses, the tangential component of the velocity being unspecified. It will be noted that the spacing of the ellipses along their major axis (through T and R) is constant, being proportional to the radial component of the assumed constant velocity. The spacing along the minor axis (perpendicular to TR) diminishes in an outward direction, approaching the spacing along the major axis.

In FIG. 6 a beat frequency $\dot{a}_1$ is derived from the output of one of the receivers, such as 62, while the bearing angle and rate of change of bearing may be derived from the phase shifter 70, the bearing rate being a function of the rate of adjustment of the phase shifter necessary to maintain a null. In practice a conventional servo system may interconnect the null detector and the phase shifter to maintain the desired balance automatically, as shown in FIG. 6. Such systems are well known in the art. The derived signals are applied to a computer 72 (along with constants such as the geographical coordinates of the transmitter and receiver), and the geographical location and the velocity of the object may thus be obtained. There are many computers presently available for performing this function, among which are the IBM 1401 and the RCA 501. The computation may be digital or analogue.

Figure 8:
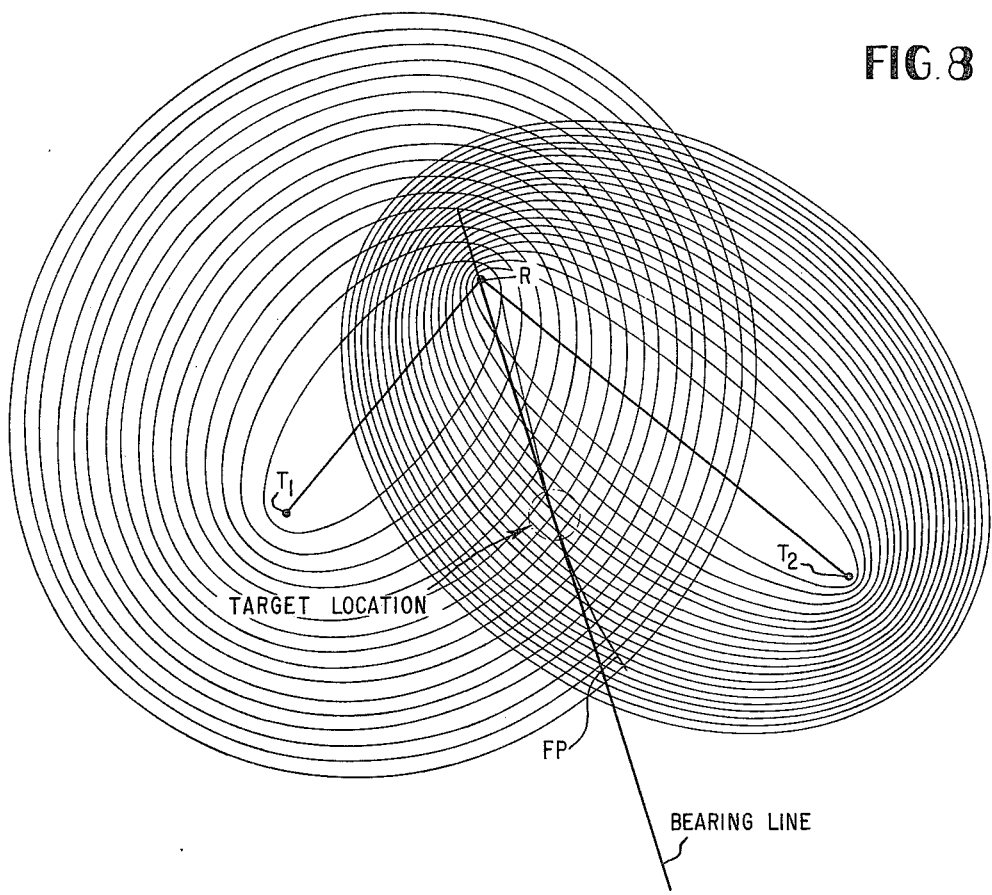
FIG. 8 is a geometric diagram illustrating the manner in which a pair of beat frequency signals may be produced in accordance with the invention.

The limitations of a single beat frequency system can be avoided, and accuracy and reliability can be significantly improved in a system employing two transmitters and producing two beat frequency signals. The geometry of such a system is illustrated in FIG. 8. Here a first family of ellipses is drawn about the foci $T_1$ and R and a second family of ellipses is drawn about the foci $T_2$ and R, the transmitters being located at points $T_1$ and $T_2$, and the receiving apparatus being located at point R. For each family of ellipses the geometry is the same as illustrated in FIG. 7. The flight path of the object to be detected is illustrated by the curved line FP tangent to the bearing line. The distance between the ellipses along their major axis is intended to be proportional to the speed of the object perpendicular to the respective ellipses. If the component of velocity of the object perpendicular to the ellipses is varying, the ellipse spacing along their major axis will vary accordingly. For each family of ellipses the path length of reflected energy changes by one wavelength of the energy from the associated transmitter as the object moves from one ellipse to the next. The reflection point moves from an intersection of an ellipse from one family and an ellipse from the other family to another such intersection and so on.

The receiving apparatus located at R receives signals directly from the transmitters $T_1$ and $T_2$ as well as by reflection from the object. Because it is desired to produce a pair of beat frequency signals corresponding to reflection of the energy transmitted by the respective transmitters, some means must be provided for distinguishing between the signals. In practice this can conveniently be done by utilizing transmitters operating at different frequencies and receivers tuned to the respective frequencies.

A two frequency receiving system for determining the geographical location and the velocity of detected objects can be constituted by adding another receiver to the apparatus previously described in FIG. 6. Thus, if receivers 62 and 64 are tuned to the frequency of the transmitter $T_1$, another receiver, 74, is tuned to the frequency of the transmitter at $T_2$. Since the bearing and bearing rate data are obtained from the system previously described, the receiver 74 may be of the type shown in FIGS. 1 or 4, for example. The output is a beat frequency $\dot{a}_2$, which is also applied to the computer 72. From the applied information (which may include the constants previously mentioned and the location of both transmitters) the geographical coordinates and velocity of the object can be readily determined.

Because the beat frequency is a function of the frequency of the transmitter, the beat frequency information must be normalized so that all beat frequencies are referred to the same base. This may be accomplished in the computer by standard computer techniques, the carrier frequencies being known and supplied to the computer.

Reliability of an object detection system may be of paramount importance. It is significant that the reliability of the systems of the invention may be increased by employing more than one receiver. Simply by using two receivers of the type shown in FIG. 1 or FIG. 4 tuned to transmitters operating at different frequencies the detection reliability of the system can be significantly increased. A greater number of signals obtained from a corresponding number of transmitters and receivers can increase the reliability even further. The beat frequency signals can be recorded, for example, and a direct comparison made to determine consistency of object detection by the respective receivers. A typical system may employ receivers tuned to frequencies which may differ by as much as 20 to 1. While frequency separation represents a convenient means for producing a plurality of distinguishable signals, it will be apparent that other means for producing distinguishable signals can be utilized. For example, a plurality of transmitters producing differently coded signals can be used in conjunction with a plurality of receivers responsive only to the code of particular transmitters.

In the foregoing embodiments of the invention the bearing and bearing rate have been utilized in determining the location and velocity of objects. It can be shown mathematically that an unambiguous determination of the Cartesian coordinates $x$ and $y$ of an object and the velocity components $\dot{x}$ and $\dot{y}$ can be made without bearing and bearing rate information by utilizing five oblique scatter receivers producing five beat frequency signals. The five beat frequency signals may be represented by the following equations:

$$\dot{a}_1 = f(x, y, \dot{x}, \dot{y})$$

$$\dot{a}_2 = g(x, y, \dot{x}, \dot{y})$$

$$\dot{a}_3 = h(x, y, \dot{x}, \dot{y})$$

$$\dot{a}_4 = j(x, y, \dot{x}, \dot{y})$$

$$\dot{a}_5 = k(x, y, \dot{x}, \dot{y}).$$

$\dot{a}_1 \ldots \dot{a}_5$ represent the beat frequency signals, which are proportional to the rate of change of the reflected path length, which is also the rate of change of the major axis of the corresponding elliptical system.

Figure 9:
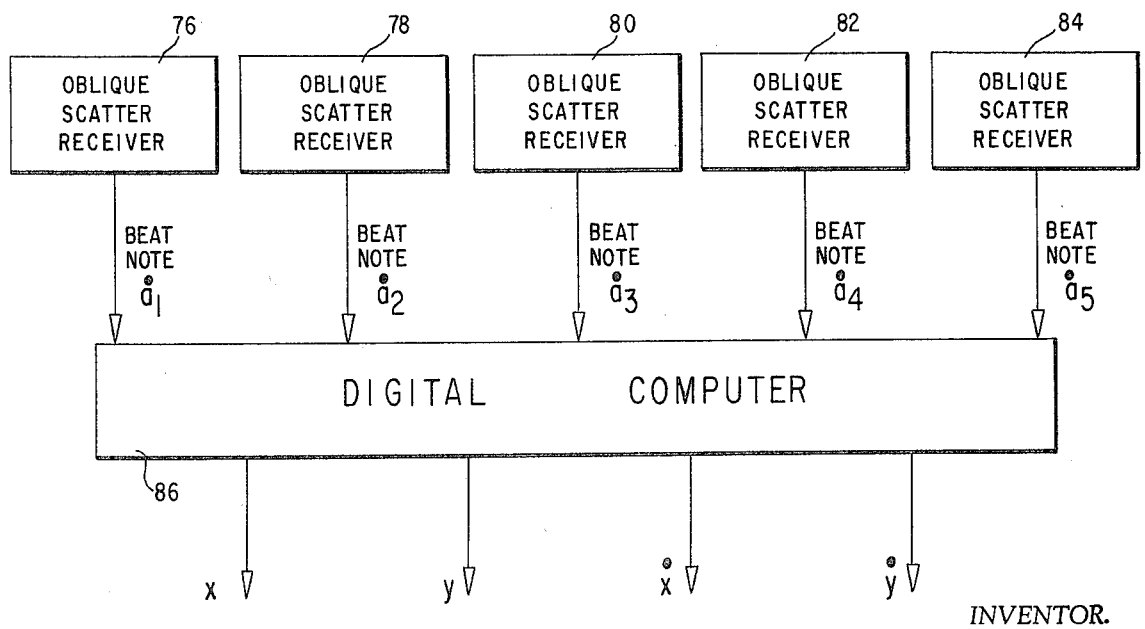
FIG. 9 is a block diagram illustrating the manner in which five beat frequency signals may be utilized in accordance with the invention to determine the location and velocity of an object.

FIG. 9 illustrates a system of the invention in accordance with the foregoing principles. Five oblique scatter receivers 76, 78, 80, 82, and 84, each of which may be of the type shown in FIG. 1 or FIG. 4, for example, are tuned to the frequencies of five spaced transmitters, each of which may have a different frequency or otherwise produces a distinguishable signal. The receiving antennas employed depend upon the type of receiver, as set forth previously. The five beat frequency outputs are applied to a computer 86 of the type previously described and may be normalized in the computer. The computer solves the five simultaneous equations (above) and produces the four unknowns $x$, $y$, $\dot{x}$ and $\dot{y}$, the fifth equation being used to resolve ambiguity.

While preferred embodiments of the invention have been shown and described, it will be apparent to those skilled in the art that changes can be made in these embodiments without departing from the principles and spirit of the invention, the scope of which is defined in the appended claims. For example, the beat frequency produced in FIG. 1 may be derived from the usual receiver output, rather than from the AGC circuit. Furthermore, a continuous recording of object location may be made by a graphical recorder connected to the position computer. Accordingly, the foregoing embodiments are to be considered illustrative, rather than restrictive of the invention, and those modifications which come within the meaning and range of equivalency of the claims are to be included therein.

The invention claimed is:

1. A method of locating an object capable of reflecting energy from five spaced transmitters to a point remote from said transmitters, which comprises producing at said remote point five signals as a function, respectively, of the relative value of the direct path length from each transmitter to said remote point and the corresponding reflected path length from each transmitter to said object and then to said remote point, and computing from said signals positional data with respect to said object.

2. Apparatus of the type described, comprising a pair of spaced antennas, a pair of signal channels connected to said antennas, respectively, means for balancing said channels in phase and amplitude for signals received by said antennas from a first direction, means for producing a difference signal from said channels in response to signals received by said antennas from a different direction, and means for mixing said difference signal with a signal from one of said channels.

3. The apparatus of claim 2, each of said channels comprising a heterodyne receiver, said balancing means comprising means for adjusting the gain of at least one of said receivers and means for adjusting the phase of the local oscillations of at least one of said receivers.

4. Apparatus of the type described, comprising a pair of spaced antennas, a pair of signal channels connected to said antennas, respectively, means for balancing said channels in phase and amplitude for signals received by said antennas from a first direction, and means for producing a difference signal from said channels in response to signals received by said antennas from a different direction, each of said channels comprising a heterodyne receiver, said balancing means comprising means for adjusting the gain of at least one of said receivers and means for adjusting the phase of the local oscillations of at least one of said receivers, said balancing means comprising a difference detector connected to said channels and having a low pass filter in its output connected to said gain control, and a phase comparator connected to said channels and having a low pass filter connected to said means for adjusting the phase of said local oscillations.

5. Apparatus of the type described, comprising five spaced transmitters of energy at different frequencies, means at a point remote from said transmitters for producing five beat frequency signals corresponding respectively to the energy transmitted from each of said transmitters and reflected to said remote point from a moving object, and means responsive to said beat frequency signals for computing positional data with respect to said object.

6. Apparatus of the type described, comprising a pair of spaced transmitters of energy at different frequencies, means at a point remote from said transmitters for producing a first beat frequency signal in response to energy from one of said transmitters reflected from a moving object, and means at said remote point for producing a second beat frequency signal in response to energy from the other of said transmitters reflected from said object, each of said means comprising a pair of spaced antennas, a pair of signal channels connected to said antennas, respectively, means for balancing said channels in phase and amplitude for signals received by said antennas from a first direction, and means for producing a difference signal from said channels in response to signals received by said antennas from a different direction.

7. A method of detecting an object capable of reflecting energy from a transmitter, which comprises transmitting energy in a first direction to a point remote from said transmitter, transmitting energy in a second direction to said object and then by reflection to said remote point, producing at said remote point in response to the transmitted energy in said first direction a pair of signals which are substantially balanced, producing at said remote point in response to the energy transmitted in said second direction a pair of signals which are substantially out of balance, obtaining the difference of the last-mentioned signals, and mixing said difference with one of the first-mentioned signals to produce an output.

8. A method of detecting an object capable of reflecting energy from a transmitter, which comprises producing in a pair of signal channels remote from said transmitter a corresponding pair of balanced signals in response to energy transmitted from said transmitter in a first direction to said channels, producing in said channels a corresponding pair of unbalanced signals in response to energy transmitted from said transmitter in a second direction and reflected from said object to said channels, obtaining the difference of the last-mentioned signals, and mixing said difference with one of the first-mentioned signals to produce an output.

9. Apparatus of the type described, comprising a plurality of receivers tuned to different frequencies and each having means for producing a beat frequency signal in response to the application of a pair of signals, one of said signals being a direct signal and the other a signal reflected from a moving object, and each having means for substantially reducing the level of said direct signal relative to that of said reflected signal, and computer means responsive to said beat frequency signals for computing positional data with respect to said object.

10. Apparatus of the type described, comprising a plurality of spaced transmitters of energy at different frequencies, means at a point remote from said transmitters for producing with respect to each of said transmitters a beat frequency signal in response to directly transmitted energy from the transmitter and energy from the transmitter reflected from a moving object, means at said remote point for substantially reducing the level of the directly transmitted energy relative to the reflected energy from each transmitter, and means responsive to said beat frequency signals for computing positional data with respect to said object.

11. A method of detecting a moving object capable of reflecting energy from a plurality of transmitters, which comprises producing at a point remote from said transmitters and said object a plurality of beat frequency signals in response, respectively, to energy transmitted directly from a corresponding transmitter and energy from that transmitter reflected from said object to said remote point, means at said remote point for substantially reducing the level of the directly transmitted energy from each transmitter relative to the corresponding reflected energy, and means for computing from said signals positional data with respect to said object.

* * * * *